United States Patent
Sauermann

(10) Patent No.: US 9,155,238 B2
(45) Date of Patent: Oct. 13, 2015

(54) STABILIZER FOR A LINK OF AN AGRICULTURAL TRACTOR

(75) Inventor: Hans Sauermann, Emsgaden (DE)

(73) Assignee: JRS GMBH & CO. KG, Ernsgaden (DE)

(*) Notice: Subject to any disclaimer, the term of this patent is extended or adjusted under 35 U.S.C. 154(b) by 435 days.

(21) Appl. No.: 13/324,646

(22) Filed: Dec. 13, 2011

(65) Prior Publication Data

US 2012/0153552 A1 Jun. 21, 2012

(30) Foreign Application Priority Data

Dec. 21, 2010 (DE) .................... 20 2010 016 822 U
Feb. 16, 2011 (DE) .................... 20 2011 002 815 U

(51) Int. Cl.
*F16F 5/00* (2006.01)
*A01B 59/041* (2006.01)

(52) U.S. Cl.
CPC .................................. *A01B 59/041* (2013.01)

(58) Field of Classification Search
CPC .................................................. A01B 59/041
USPC ............. 267/194, 195, 188; 280/455.1, 456.1
See application file for complete search history.

(56) References Cited

U.S. PATENT DOCUMENTS

| | | | | |
|---|---|---|---|---|
| 2,113,071 A * | 4/1938 | Bernard | ...................... | 267/194 |
| 2,878,043 A * | 3/1959 | Edman et al. | ................... | 403/46 |
| 3,722,920 A * | 3/1973 | Reese | ......................... | 280/455.1 |
| 3,948,544 A * | 4/1976 | Presley et al. | .............. | 280/455.1 |
| 4,865,134 A * | 9/1989 | Rugen et al. | ................... | 172/450 |
| 5,042,588 A * | 8/1991 | Herchenbach et al. | ....... | 172/439 |
| 5,076,369 A * | 12/1991 | Herchenbach | ................ | 172/439 |
| 5,361,850 A * | 11/1994 | Muller et al. | ................ | 172/450 |
| 5,462,303 A * | 10/1995 | Langen et al. | ............. | 280/455.1 |
| 5,823,271 A * | 10/1998 | Muller et al. | ................ | 172/450 |
| 6,131,937 A * | 10/2000 | Coenen | ..................... | 280/455.1 |
| 6,367,369 B1 * | 4/2002 | Coenen | ........................... | 92/129 |
| 6,386,571 B1 * | 5/2002 | Vollmer et al. | ............ | 280/455.1 |
| 6,609,575 B1 * | 8/2003 | Crabb | .......................... | 172/439 |
| 6,655,468 B2 * | 12/2003 | Casali et al. | ................. | 172/439 |
| 7,033,066 B2 * | 4/2006 | Helder | ........................... | 366/68 |
| 8,353,639 B2 * | 1/2013 | Kelly et al. | .................... | 403/46 |
| 2004/0113341 A1 * | 6/2004 | McConnell et al. | ......... | 267/195 |

* cited by examiner

*Primary Examiner* — Robert A Siconolfi
*Assistant Examiner* — James Hsiao
(74) *Attorney, Agent, or Firm* — Epstein Drangel LLP; Robert L. Epstein

(57) ABSTRACT

A stabilizer serves for stabilizing a link of a three-point suspension system of an agricultural tractor. The stabilizer has at least one telescope consisting of a tube and a piston held displaceably therein. Said tube and piston are coupled elastically by at least one spring. The piston is designed such that it can be adjusted in length by means of at least one thread. In order to retain the telescope, the stabilizer has at least one pivotably held retaining clip. In a retaining position, said retaining clip engages over an abutment of the piston whereas, in a release position of the retaining clip, the piston can be freely moved. In order to obtain simple handleability of said stabilizer, the abutment is formed by at least one substantially rotationally symmetrical disc. The piston length can therefore be adjusted in or in the vicinity of the retaining position.

15 Claims, 2 Drawing Sheets

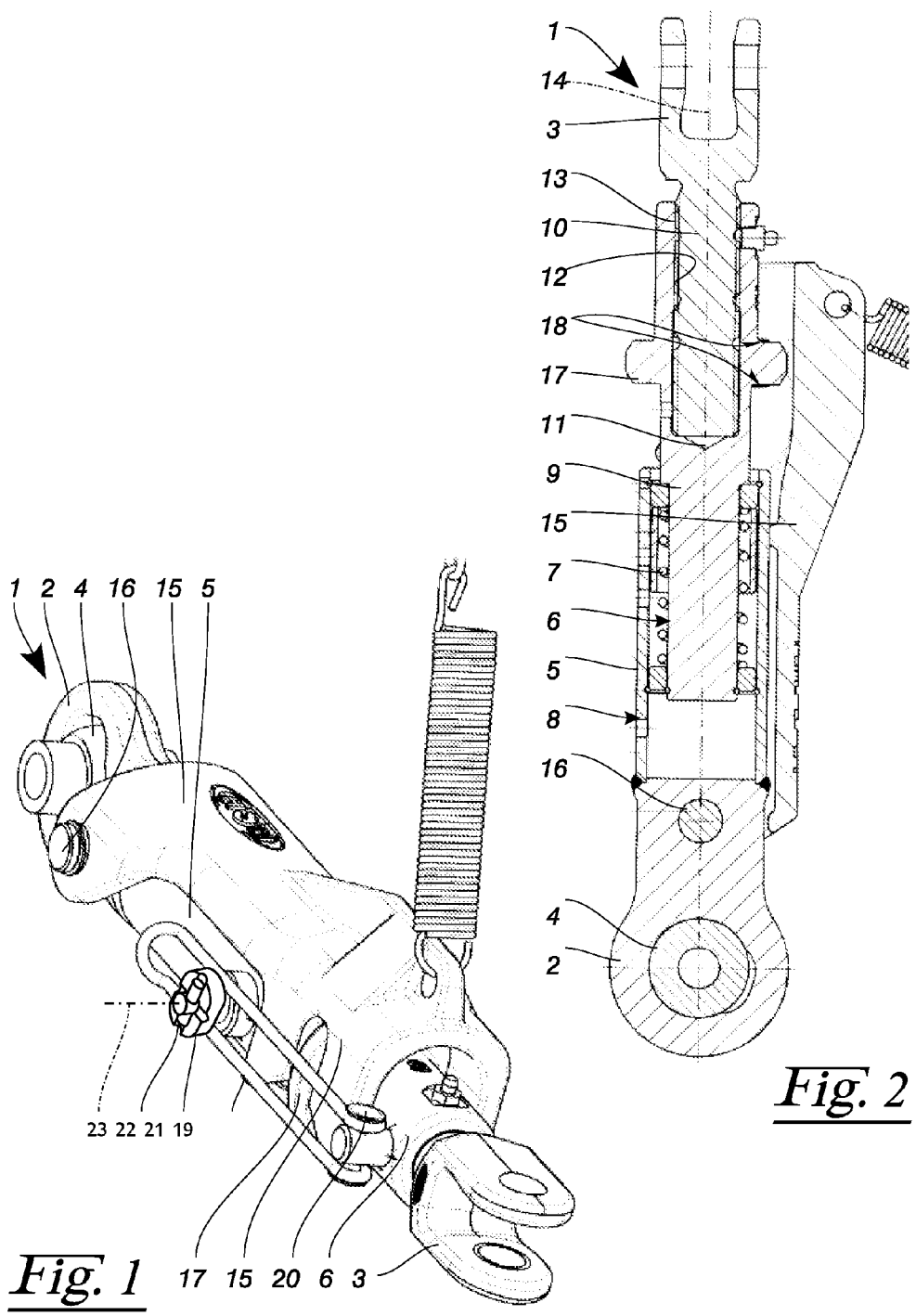

STABILIZER FOR A LINK OF AN AGRICULTURAL TRACTOR

Figure 3:
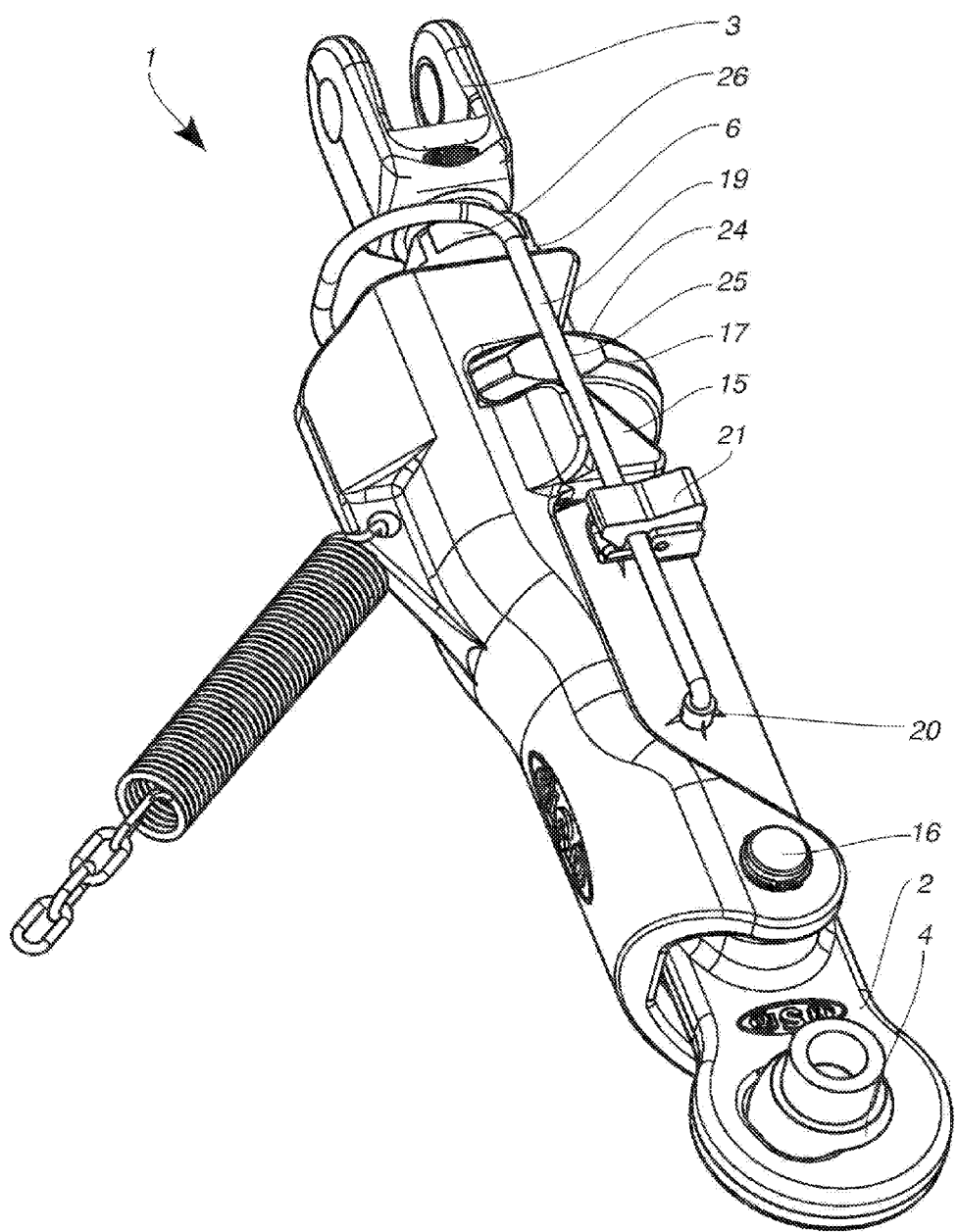

The present application claims priority to German patent application numbers:
DE 20 2010 016 822.8, filed Dec. 21, 2010
DE 20 2011 002 815.1, filed Feb. 16, 2011.

FIELD OF THE INVENTION

The invention relates to a stabilizer for a link of a three-point suspension system of an agricultural tractor

DESCRIPTION OF THE PRIOR ART

DE 199 44 749 A1 discloses a stabilizer for a lower link of an agricultural tractor. Said stabilizer has a telescope which is formed by a tube and a piston running therein. A spring which elastically couples the piston to the tube is provided between the two. The piston is designed in two pieces, wherein both parts can be adjusted in relation to each other by means of a thread. The piston length can thereby be set. This is important in order to be able to adapt the length of the stabilizer to particular requirements. In order to block the telescope for travel on a public road, a retaining clip is held pivotably on the tube, said retaining clip engaging over an abutment of the piston. This stabilizer has repeatedly proven worthwhile in practice and forms the starting point of the present invention.

The invention is based on the object of providing a stabilizer of the type mentioned at the beginning, which stabilizer is distinguished by simpler handling.

This object is achieved according to the invention by the following features.

BRIEF SUMMARY OF THE INVENTION

A stabilizer serves primarily for lower links, but is also suitable for upper links of a three-point suspension system. The stabilizer has the essential object of correcting a lateral movement of the lower link and/or upper link by spring action. A floating hitching of the working implement fastened to said stabilizer is therefore possible, which is imperative, for example, in the case of a plough. In order for said object to be fulfilled, the stabilizer has at least one telescope which is formed by a tube and a piston held displaceably therein. The piston and the tube are elastically coupled by at least one spring. During a lateral pivoting movement of the lower link and/or upper link, the stabilizer is compressed and/or extended, which leads to a corresponding spring force. The stabilizer thereby elastically counters the lateral movement without completely suppressing said movement. As a result, a working implement connected to the three-point suspension system of the agricultural tractor is guided elastically. Since different working implements may differ greatly in width, the length of the stabilizer has to be set. Said adjustability of the length cannot be undertaken by the telescope itself, since otherwise the working point of the spring would be considerably displaced with the width of the mounted implement. In order to obtain said setting capability, the piston is divided in two and can be adjusted in length by means of at least one thread. Therefore, by rotation of part of the piston, the length of the piston can be set in such a manner that the stabilizer can be adapted to the particular requirements of the mounted implement. The stabilizer therefore exerts an elastic force on the lower link and/or upper link of the three-point suspension system of the agricultural tractor, said elastic force, as the mounted implement increasingly swings out laterally in relation to the agricultural tractor, returning said mounted implement back into the desired track. Nevertheless, the mounted implement can execute lateral movements so that a plough may avoid, for example, a stone in the ground. This behaviour of the mounted implement that is required during operation in the field is problematic when the agricultural tractor is transferred to public road traffic. The mounted implement may swing out in particular during travel through bends, thus impermissibly putting the public road traffic at risk. For this reason, the telescope of the stabilizer has to be blocked in public road traffic. A pivoting movement of the lower link and/or upper link of the three-point suspension system of the agricultural tractor is therefore reliably suppressed. In order to be able to realize said retention in a simple manner, at least one retaining clip is held pivotably on the tube. In a retaining position, said retaining clip engages over at least one abutment of the piston. The retaining position here is to be understood as meaning any position in which the telescope is at least partially blocked. Small moveability of the telescope in the retaining position is unimportant. By contrast, in a release position, the retaining clip does not influence the telescope, and therefore the latter can be moved under the action of the at least one spring. The stabilizer therefore fulfils the conditions of operation in the field and also in public road traffic.

In the case of known stabilizers, in order to set the length of the piston of the stabilizer the retaining clip had to be pivoted into the release position and the piston subsequently rotated until said piston, by means of the action of the thread, takes up the desired length. However, in the release position of the retaining clip, it is no longer simple for the operator to identify the specific length the piston is intended to take up. For this reason, the adjustment of the piston length has had to be repeatedly interrupted in order, by displacement of the retaining clip into the retaining position, to permit checking of the piston length.

In order to solve this problem, provision is made for the abutment of the tube to be formed by at least one substantially rotationally symmetrical disc. The piston is therefore independent of the rotational position of the piston. The piston length can thereby be adjusted in the retaining position of the retaining clip. However, the telescope is retained in said retaining position, and therefore the achieving of the correct piston length is immediately visible without further measures. The adjustment of the piston length is therefore considerably simplified and does not have to be interrupted in particular by an awkward transfer of the retaining clip into the retaining position and subsequently into the release position again. As an alternative, the piston length may also be adjusted in the vicinity of the retaining position. If the engagement surfaces of the piston and of the retaining clip are at a spacing of at maximum 5 mm, the setting of the piston length can continue to be checked with sufficient precision.

In order to prevent an undesirable adjustment of the rotational position of the piston, it is favourable if at least one locking clip acts on the piston, said locking clip interacting with the abutment or with a further abutment of the tube or piston in order to prevent rotation of the piston. If only a further abutment, which interacts with the locking clip, is provided, the piston can only be adjusted by an integral multiple of the thread pitch. This is frequently insufficient, and therefore a more sensitive adjustment is desirable. In this case, at least two locking clips and/or at least two further abutments are provided in order thereby to expand the adjustment option to integral multiples of half the thread pitch. If at least four further abutments are provided, the sensitivity of the adjustment can be improved even further, to integral multiples of a quarter thread pitch.

To further improve the handling of the stabilizer, it is advantageous if the locking clip can be pivoted into an actuating position such that the locking clip can be used as a handle for rotating the piston. This gives rise to a long lever for rotating the piston. This facilitates the rotation of the piston, since only relatively smaller forces are required to apply the necessary torques. In addition, double use is thereby made of the locking clip.

In order to prevent the locking clip from becoming automatically undone, for example while underway, it is advantageous if the further abutment of the locking clip is formed by a resiliently held pushbutton. Said pushbutton is loaded resiliently outwards and can be rotated inwards by pressure. Objects, such as branches or the like, can therefore be prevented from inadvertently releasing the locking of the locking clip.

The pushbutton can be brought into a locking position in which the locking clip is secured. In addition, said pushbutton can be brought into a release position in which the locking clip can be pivoted. The pushbutton is preferably transferred from one position into the other by rotation about the axis thereof.

If the abutment itself is to be used as a means of securing the piston against rotation, it is advantageous if the abutment is flattened or notched in order to receive the locking clip. By means of this slight deviation from the ideal rotational symmetry of the abutment in the region of catching hold of the locking clip, torque is reliably transmitted from the locking clip to the abutment and therefore to the piston. It is ensured in this case that, in the locking position thereof, the locking clip secures the abutment against rotation whereas, in the release position of the locking clip, the abutment can be freely rotated. In particular, the retaining clip here can remain in the retaining position thereof without impairing the rotation of the abutment and therefore of the piston. According to the details for claim 2, a finer adjustment of the length can be obtained by multiple flattened portions or notches being provided in the abutment. Preferably, at least two flattened portions or notches are provided. For a particularly sensitive adjustment of the stabilizer, it is advantageous if at least four flattened portions or notches are provided.

In order to prevent damage to the abutment or to the retaining clip, it is favourable if the retaining clip has at least one stop surface which catches hold of the abutment of the piston in a planar manner. Impact forces are therefore distributed over a relatively great area, which correspondingly reduces the stress concentration in the abutment or in the retaining clip.

It is advantageous if the retaining clip has at least two stop surfaces which take hold of the abutment of the piston in a planar manner on both sides. Stress concentrations are therefore kept small both during tensile forces and during shearing forces.

The retaining clip is necessarily weakened in the region of the disc-shaped abutment while said retaining clip engages over the abutment on both sides thereof. In order to prevent the retaining clip from breaking in the region of the abutment, it is therefore expedient, if the retaining clip is reinforced there. In particular, a wedge-shaped extension is proposed as the reinforcement.

Finally, it is favourable if the locking clip can be rotated in relation to the piston and can be connected by means of at least one ratchet spanner. The piston can therefore be rotated even under restricted space conditions when, for example, complete rotation of the locking clip into the actuating position thereof is not possible. In this case, adjustment of the locking clip through a certain angle is sufficient, wherein the locking clip is subsequently transferred back again into the original position thereof without affecting the position of the piston.

If the locking clip itself is not to be used to rotate the piston, it is advantageous to provide at least four spanner surfaces on the piston. An open-end spanner can be fitted onto said spanner surfaces, in order to rotate the piston. After rotation through 90°, the open-end spanner can be re-fitted in order to permit adjustment of the stabilizer even under restricted conditions.

BRIEF DESCRIPTION OF THE SEVERAL VIEWS OF DRAWINGS

Other advantages and characteristics of this invention will be explained in the detailed description below with reference to the associated figures that contain several embodiments of this invention. It should however be understood, that the figure is just used to illustrate the invention and does not limit the scope of protection of the invention.

Wherein:

FIG. 1 shows a three-dimensional illustration of a stabilizer for an agriculture tractor, FIG. 2 shows an associated sectional illustration of the stabilizer according to FIG. 1, and FIG. 3 shows a three-dimensional illustration of a second embodiment of a stabilizer.

DETAILED DESCRIPTION OF THE INVENTION

A stabilizer 1 according to FIGS. 1 and 2 has a first bearing 2 and a second bearing 3. Customarily, the first bearing 2 is held at the rear of an agriculture tractor via a ball 4 whereas the second bearing 3 is connected to a lower link and/or upper link (not illustrated). The stabilizer 1 can therefore influence a lateral movement of the lower link and/or upper link.

The stabilizer 1 consists of a tube 5 which is connected to the first bearing 2. A piston 6 is supported displaceably in the tube 5. A spring 7 is provided between the tube 5 and the piston 6, said spring producing an elastic coupling between the tube 5 and the piston 6. The tube 5 and the piston 6 form a telescope 8 which permits a certain variation in the length of the stabilizer 1.

The piston 6 is formed in two pieces. Said piston consists of a first part 9, on which the spring 7 acts, and of a second part 10 which bears the second bearing 3. A blind hole 11 with an internal thread 12 which receives an external thread 13 of the second part 10 is provided in the first part 9 of the piston 6. If the second bearing 3 is secured to the lower link and/or upper link, said bearing cannot rotate about the longitudinal axis 14 thereof. However, by rotation of the first part 9 of the piston 6, the piston length can be set corresponding to the particular requirements.

In order to reliably avoid undesirable swinging out of the lower link and/or upper link during travel in public road traffic, it is necessary to block the telescopic capability of the stabilizer 1 in said use situation. For this purpose, a retaining clip 15 is held on the tube 5 so as to be pivotable about an axis 16. Said retaining clip 15 engages on both sides over an abutment 17 of the piston 6, which abutment is designed as a disc. For this purpose, the retaining clip 15 has two stop surfaces 18 which, in the illustrated retaining position of the retaining clip 15, bear against the abutment 17 in a planar manner. The retaining clip 15 can also be pivoted in a release position (not illustrated) in which the stop surfaces 18 are disengaged from the abutment 17. In this position, the telescope 8 can be freely moved.

In order to permit rotation of the first part 9 of the piston 6 about the longitudinal axis 14 thereof even in the retaining position of the retaining clip 15, the abutment 17 is of substantially rotationally symmetrical design. It can therefore always be checked whether the length of the stabilizer 1 has already been correctly set.

In order to prevent the length of the piston 6 from being unintentionally adjusted, a locking clip 19 is supported pivotably on the piston 6. Said locking clip 19 can be pivoted about an axis 20 and can be brought into a locking position illustrated in FIG. 2. In said locking position, the locking clip 19 engages over a further abutment 21. This suppresses rotation of the piston 6, wherein the telescopic capability of the stabilizer 1 is possible or is suppressed depending in each case on the position of the retaining clip 15. The further abutment 21 consists of a pushbutton 22 which is pressed radially away from the piston 6 in a resilient manner. By the pusbbutton 22 being pressed in counter to the spring force, said pushbutton can be rotated about an axis 23. In this case, said pushbutton can be transferred from the locking position illustrated into a release position which is rotated through 90° and in which the locking clip 19 can be brought into the release position (not illustrated). In said release position, the locking clip 19 is disengaged from the further abutment 21.

FIG. 3 shows an alternative embodiment of a stabilizer 1 according to FIG. 1, wherein the same reference numbers identify the same parts. Only the differences over the embodiment according to FIG. 1 will be discussed below.

In this embodiment, the axis 20 of the locking clip 19 is located on the tube 5 and can be pivoted upwards. The locking clip 19 engages around the abutment 17 in such a manner that, in the locking position illustrated, the abutment 17 cannot be rotated. For this purpose, the abutment 17 has flattened portions 24, in the centre of which notches 25 are provided. The locking clip 19 is received in said notches 25. If a torque acts on the piston 6, said torque is transmitted via the abutment 17 to the locking clip 19. Owing to the flattened portion 24 and the notch 25, the locking clip 19 would have to be expanded in order to be able to yield to said torque. However, the stability and manner of construction of said locking clip prevents said expansion, and therefore the piston 6 cannot be rotated in said locking position.

The locking clip 19 is retained in the illustrated locking position by the further abutment 21. By actuation of said further abutment 21, the locking clip 19 can be pivoted freely about the axis 20. In the process, said locking clip becomes disengaged from the abutment 17. The abutment 17 and consequently also the piston 6 can therefore be rotated when the retaining clip 15 is closed.

Since at least four flattened portions 24 and notches 25 are provided on the abutment 17, a more sensitive adjustment of the length of the stabilizer 1 is possible than corresponds to the thread pitch of the internal thread 12 and external thread 13.

In addition, the piston has four spanner surfaces 26. Said spanner surfaces 26 serve for the connection to an open-end spanner (not illustrated) in order to permit simple rotation of the abutment 17. In restricted space conditions, complete rotation of the open-end spanner may be possible only with difficulty, if at all. By means of the provision of at least four spanner surfaces, after rotation through 90° said spanner can be re-fitted again to the next pair of spanner surfaces 26. The open-end spanner (not illustrated) is preferably secured to the stabilizer 1 via corresponding holders so that said open-end spanner is immediately available for adjustment of said stabilizer. A magnetic holder, in particular, is conceived of as the holder.

Since some of the embodiments of this invention are not shown or described, it should be understood that a great number of changes and modifications of these embodiments is conceivable without departing from the rationale and scope of protection of the invention as defined by the claims.

LIST OF REFERENCE NUMBERS

1 Stabilizer
2 First bearing
3 Second bearing
4 Ball
5 Tube
6 Piston
7 Spring
8 Telescope
9 First part
10 Second part
11 Blind hole
12 Internal thread
13 External thread
14 Longitudinal axis
15 Retaining clip
16 Axis
17 Abutment
18 Stop surface
19 Locking clip
20 Axis
21 Further abutment
22 Pushbutton
23 Axis
24 Flattened portion
25 Notch
26 Spanner surface

The invention claimed is:

1. A stabilizer for a link of a three-point suspension system of an agricultural tractor, said stabilizer being of the type that has a telescoping member consisting of a tube and a piston dispaceably mounted within said tube, said piston comprising first and second parts and means for rotatably connecting said first and second parts to adjust the length of said piston, an abutment on said first part of said piston, and a spring elastically coupling said tube and said first part of said piston, said stabilizer comprising a retaining clip and means for moveably mounting said retaining clip relative to said tube, said retaining clip being moveable between a retaining position, wherein a portion of said retaining clip engages said abutment such that movement of said first part of said piston relative to said tube is inhibited, and a release position, wherein said portion of said retaining clip is remote from said abutment, such that said piston is freely displaceable within said tube, wherein said abutment comprises a substantially rotationally symmetrical disc.

2. The stabilizer according to claim 1, wherein said stabilizer further comprises a locking clip adapted to interact with said abutment to prevent rotation of said piston.

3. The stabilizer according to claim 2, wherein said stabilizer further comprises a second abutment said locking clip being adapted to interact with said second abutment to prevent rotation of said piston.

4. The stabilizer according to claim 3, further comprising means for mounting second abutment on said tube.

5. The stabilizer according to claim 3, further comprising means for mounting said second abutment on said piston.

6. The stabilizer according to claim 2, means for pivotally mounting said locking clip for movement into an actuating position such that said locking clip can be used as a handle for rotating said piston.

7. The stabilizer according to claim 2, wherein said abutment comprises a flattened portion adapted to receive said locking clip.

8. The stabilizer according to claim 2, wherein said abutment comprises a notch adapted to receive said locking clip.

9. the stabilizer according to claim 1, wherein said retaining clip comprises a stop surface which interacts with said abutment of said piston in a planar manner.

10. The stabilizer according to claim 1, wherein said retaining clip comprises a portion in the region which interacts with said abutment of said piston.

11. The stabilizer according to claim 1 in combination with a spanner, wherein said piston comprises a notched surface and wherein said locking clip can be rotated in relation to said piston by said spanner.

12. The combination according to claim 11, wherein said piston comprises two spanner surfaces.

13. A stabilizer for a link of a three-point suspension system of an agricultural tractor, said stabilizer being of the that has a telescoping member consisting of a tube and a piston dispaceably mounted within said tube, said piston comprising first and second arts and means for rotatably connection said first and second parts to adjust the length on said piston, an abutment on said first part of said piston, and spring elastically coupling said tube and said first part of said piston, said stabilizer comprising a retaining clip and means for moveable mounting said retaining clip relative tube, said retaining clip being moveable between a retaining position, wherein a portion of said retaining clip engages said abutment such that movement of said first part of said piston relative to said tube is inhibited, and a release position, wherein said portion of said retaining clip is remote from said abutment, such that said piston is freely displaceable within said tube, wherein said abutment comprises a substantially rotationally symmetrical disc, wherein said stabilizer further comprises a locking adapted to interact with said abutment to prevent rotation of said piston and wherein said stabilizer further comprises a second abutment said locked clip being adapted to interact with said second abutment to prevent rotation of said piston, and wherein said second abutment comprises a rotatable pushbutton movable between an outer position wherein the pushbutton cannot be rotated and an inner position wherein said pushbutton can be rotated.

14. The stabilizer according to claim 13, wherein said pushbutton is movable between a locking position in which said locking clip is secured, and a release position in which said locking clip can be moved.

15. The stabilizer according to claim 13, wherein said abutment has first and second sides and said retaining clip comprises two stop surfaces adapted to interact with both sides said abutment of said piston in a planar manner.

* * * * *